Dec. 11, 1928.
V. LEFEBURE
1,694,476
RUBBER FLOORING
Filed Jan. 16, 1925
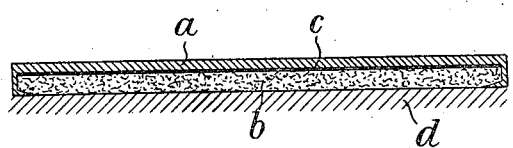
INVENTOR
VICTOR LEFEBURE
By Toulmin&Toulmin,
ATTORNEYS Patented Dec. 11, 1928.

1,694,476

UNITED STATES PATENT OFFICE.

VICTOR LEFEBURE, OF LONDON, ENGLAND.

RUBBER FLOORING.

Application filed January 16, 1925, Serial No. 2,786, and in Great Britain May 6, 1924.

This invention relates to rubber flooring.

Sheets or tiles of soft rubber are being used in an increasing number of instances for forming flooring surfaces, but considerable difficulty has been experienced in satisfactorily fixing the sheets or tiles in position on the wood, concrete, or brick or other surfaces constituting the floor base. Securing the sheets or tiles in position has necessitated the employment of expert staffs and special adhesive solutions; but in spite of these precautions a satisfactory method of fixing has not hitherto been arrived at, and there have been numerous instances of the rubber flooring parting from the base. This trouble is usually due either to the penetration of moisture through the base or through cracks in the top surface; or to the softening of the adhesive layer in warm localities or atmospheres. This will be understood from the fact that such solutions are usually of two types; either rubber solutions which soften under heat and are not entirely water-resistant, or casein adhesives which soften under prolonged contact with water.

The object of the present invention is to provide a new or improved manner of constructing rubber floorings in general; and, more particularly, to provide a means whereby the rubber may be satisfactorily and permanently secured to the surface beneath it without any liability of moisture or other unfavourable conditions causing the surface to lift. The most satisfactory method known of associating rubber with any material which does not decompose on heating is to vulcanize the rubber on and in the presence of that material. I therefore vulcanize my rubber flooring on to materials which themselves can be readily and permanently associated with the floor base.

According to the present invention I employ a rigid intermediate layer or section formed of asbestos cement and I vulcanize a uniform-surfaced rubber floor element or elements, in the form of rubber-sheets, tiles, or the like directly on to the said intermediate layer or section. A rubber composition usually in the form of a solution, which will vulcanize in contact with and in the same time as the rubber floor element sheets or tiles, is preferably employed for impregnating or treating the contacting surfaces so that a very strong permanent connection is made. When the intermediate layers or sections have had the rubber surface securely vulcanized in position, they are secured in position to the floor base in any suitable manner. Where the floor base is of concrete, stone, or brick, asbestos cement being used to form the intermediate layer, a perfect union can be made between it and the floor base by means of certain standard flooring cements.

In cases where a very strong junction is required between the rubber and the intermediate layer, I use a synthetic resin or hard rubber junction applied in liquid or plastic form, in the latter case usually as calendered sheet. This applies to floors which are subjected to the movement of very heavy weights.

The rubber is mixed and sheeted in the usual way, any desired decorative effect being given, and the sheet is then cut to the required size, placed on to the backing material of asbestos cement, which has been previously treated with the junction material, for example, rubber solution, and the whole placed in the mould and vulcanized in a press. When cured, the rubber and backing are found to be firmly and permanently joined together.

Referring to the drawing filed herewith, which illustrates in section a flooring made according to this invention:

$a$ is the rubber floor element, $b$ is the backing material of asbestos cement, $c$ is the junction material, and $d$ is the floor base.

The expression "backing layer" is applied to the asbestos cement in certain of the claims directed in terms to a tile, while in other claims directed broadly to a floor structure the asbestos cement is referred to as an "intermediate layer", because it lies between the floor base and the rubber surface element.

What I claim and desire to secure by Letters Patent is:—

1. A floor construction comprising a base, a rigid intermediate layer of asbestos cement secured to said base, and rubber surface floor elements vulcanized on to said intermediate layer.

2. A floor construction comprising a base, a rigid intermediate layer of asbestos cement secured to said base, rubber surface floor elements and a rubber adhesive between said intermediate layer and surface floor elements and vulcanized to each.

3. A floor tile comprising a rigid backing layer of cement and asbestos and a rubber surface layer vulcanized thereto.

4. A floor tile comprising a rigid backing layer of cement and asbestos, a rubber surface and an intermediate rubber adhesive vulcanized to each.

In testimony whereof, I affix my signature.

VICTOR LEFEBURE.